(12) United States Patent
Nakamura et al.

(10) Patent No.: US 9,686,433 B2
(45) Date of Patent: Jun. 20, 2017

(54) MFP FOR MANAGING INFORMATION PROCESSING REQUEST EXECUTION PRIORITY ACCORDING TO DISTANCES AND SPEEDS OF TERMINAL DEVICES FROM WHICH INFORMATION PROCESSING REQUESTS ARE RECEIVED

(71) Applicants: Masaki Nakamura, Kanagawa (JP); Hideki Hino, Kanagawa (JP)

(72) Inventors: Masaki Nakamura, Kanagawa (JP); Hideki Hino, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/927,163

(22) Filed: Oct. 29, 2015

(65) Prior Publication Data
US 2016/0127592 A1 May 5, 2016

(30) Foreign Application Priority Data

Oct. 30, 2014 (JP) .................. 2014-221868
Feb. 25, 2015 (JP) .................. 2015-035588
Oct. 19, 2015 (JP) .................. 2015-205819

(51) Int. Cl.
*H04N 1/00* (2006.01)

(52) U.S. Cl.
CPC ....... *H04N 1/00923* (2013.01); *H04N 1/0092* (2013.01); *H04N 1/00917* (2013.01)

(58) Field of Classification Search
CPC .................. H04N 1/00923; H04N 1/0092
See application file for complete search history.

(56) References Cited

U.S. PATENT DOCUMENTS

| | | | |
|---|---|---|---|
| 2003/0103777 A1 | 6/2003 | Nakamura et al. | |
| 2007/0124436 A1* | 5/2007 | Shepherd | G06F 3/1226 709/223 |
| 2012/0212766 A1* | 8/2012 | Imamoto | G06F 3/122 358/1.14 |
| 2014/0023383 A1* | 1/2014 | Kogusuri | G03G 15/553 399/8 |

(Continued)

FOREIGN PATENT DOCUMENTS

| | | |
|---|---|---|
| JP | 2003-167703 | 6/2003 |
| JP | 2010-130644 | 6/2010 |
| JP | 2013-175060 | 9/2013 |

*Primary Examiner* — Benjamin O Dulaney
(74) *Attorney, Agent, or Firm* — Harness, Dickey & Pierce, PLC

(57) ABSTRACT

An information processing device includes: a replacement processing unit that replaces, when a second time as a time until a distance between a second terminal device that has transmitted a second information processing request having a lower priority and the information processing device becomes equal to or smaller than a predetermined value is shorter than a first time as a time until the distance between a first terminal device that has transmitted a first information processing request having a higher priority and the information processing device becomes equal to or smaller than a predetermined value, priorities for executing first information processing request and the second information processing request such that the second information processing request having the lower priority is processed earlier than the first information processing request having the higher priority.

20 Claims, 12 Drawing Sheets

(56) References Cited

U.S. PATENT DOCUMENTS

| | | | |
|---|---|---|---|
| 2015/0079933 A1* | 3/2015 | Smith | H04W 4/02 455/411 |
| 2016/0011833 A1* | 1/2016 | Takayanagi | G06F 3/1292 358/1.15 |
| 2016/0028912 A1* | 1/2016 | Harada | H04N 1/00923 358/1.15 |
| 2016/0105766 A1* | 4/2016 | De La Broise | H04W 12/06 455/456.1 |

* cited by examiner

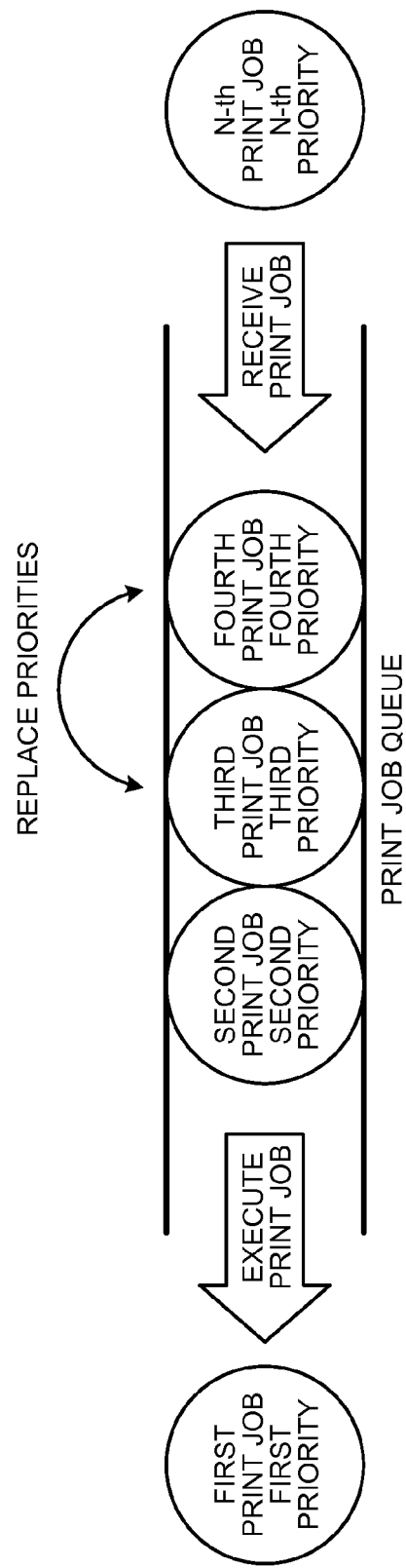

FIG.7

| | CONDITIONAL EXPRESSION | PRIORITY REPLACEMENT | DETAILS OF SITUATION |
|---|---|---|---|
| FIRST SITUATION | FIRST CONDITION $Ta>Tb$ SECOND CONDITION $Na>Nb$ THIRD CONDITION $Ta-Cb-Ca \geq 0$ | TO BE REPLACED | SENDER B COMES TO COLLECT PRINTED MATTER EARLIER THAN SENDER A PRINT JOB A HAS HIGHER PRIORITY THAN THAT OF PRINT JOB B SENDER A DOES NOT NEED TO WAIT EVEN WHEN PRINT JOBS A AND B ARE PROCESSED |
| SECOND SITUATION | FIRST CONDITION $Ta>Tb$ SECOND CONDITION $Na>Nb$ THIRD CONDITION $Ta-Cb-Ca<0$ | NOT TO BE REPLACED | SENDER B COMES TO COLLECT PRINTED MATTER EARLIER THAN SENDER A PRINT JOB A HAS HIGHER PRIORITY THAN THAT OF PRINT JOB B SENDER A NEEDS TO WAIT WHEN PRINT JOBS A AND B ARE PROCESSED |

MFP FOR MANAGING INFORMATION PROCESSING REQUEST EXECUTION PRIORITY ACCORDING TO DISTANCES AND SPEEDS OF TERMINAL DEVICES FROM WHICH INFORMATION PROCESSING REQUESTS ARE RECEIVED

CROSS-REFERENCE TO RELATED APPLICATIONS

The present application claims priority to and incorporates by reference the entire contents of Japanese Patent Application No. 2014-221868 filed in Japan on Oct. 30, 2014, Japanese Patent Application No. 2015-035588 filed in Japan on Feb. 25, 2015 and Japanese Patent Application No. 2015-205819 filed in Japan on Oct. 19, 2015.

BACKGROUND OF THE INVENTION

1. Field of the Invention

The present invention relates to an information processing device, an information processing system, and an information processing method.

2. Description of the Related Art

In recent years, known are application programs enabling remote control of various settings, implementation, and/or the like of a copying function, a scanner function, a facsimile function, and a printing function of an MFP using a portable terminal device such as a smartphone and a tablet terminal device. MFP is an abbreviation for a "multifunction peripheral". By using such an application program, a user can remotely control the MFP via a portable terminal device of each user at a desired place and a desired timing.

Japanese Laid-open Patent Publication No. 2003-167703 discloses a job processing method performed by a printer for setting a priority order of execution appropriate for each print job to be processed when a plurality of print jobs are transmitted to one MFP. In this job processing method, printing operation time and the number of sheets to be printed are calculated for each print job. As a result of calculation, a priority is given to each print job. Accordingly, when the print jobs compete with each other in a printer device, an optimum order of priority can be determined to execute printing.

However, MFPs in the related art that can be remotely controlled via a portable terminal device process a print job transmitted from the portable terminal device in the same way as a print job received via an operation panel installed in the MFP. For example, when a print job transmitted from the portable terminal device of a user at a place distant from the MFP has been received earlier than a print job of a user at a position near the MFP, the MFP processes the print job of the user at the distant position in preference to the print job of the user at the position near the MFP.

Due to this, the user at the position near the MFP needs to wastefully wait until the print job of the user at the distant position, who takes time to collect printed matter, is finished although the user near the MFP can immediately collect the printed matter.

In the job processing method performed by the printer disclosed in Japanese Laid-open Patent Publication No. 2003-167703, the priority of each print job is determined from a calculation result of the number of sheets to be printed and the printing operation time for each print job. Accordingly, similarly to the above case, there is a problem that the print job of the user at the distant place, who takes time to collect the printed matter, is executed earlier, and the user at the position near the MFP needs to wastefully wait for processing of the print job although he/she can immediately collect the printed matter.

In view of such a problem as described above, the job processing methods in the MFP in the related art that can be remotely controlled via the portable terminal device and the printer disclosed in Japanese Laid-open Patent Publication No. 2003-167703 have been inefficient printing methods.

In view of the above, there is a need to provide an information processing device, an information processing system, and an information processing method that can enhance efficiency of information output.

SUMMARY OF THE INVENTION

It is an object of the present invention to at least partially solve the problems in the conventional technology.

An information processing device includes: a storage processing unit that receives an information processing request transmitted from a terminal device and then stores the information processing request and a priority for executing the information processing request in a storage unit in association with each other; an information processing unit that executes information processing requests stored in the storage unit in order from an information processing request in association with which a higher priority is stored; a moving speed calculation unit that calculates a moving speed of the terminal device based on, out of positional information transmitted at predetermined timings from the terminal device that has transmitted the information processing request, first positional information transmitted at a first timing and second positional information transmitted at a second timing subsequent to the first positional information; a time calculation unit that calculates a time until a distance between the terminal device and the information processing device becomes equal to or smaller than a predetermined value based on the moving speed calculated by the moving speed calculation unit, positional information of the information processing device, and the second positional information; and a replacement processing unit that replaces, when a second time as a time until the distance between a second terminal device that has transmitted a second information processing request having a lower priority and the information processing device becomes equal to or smaller than a predetermined value is shorter than a first time as a time until the distance between a first terminal device that has transmitted a first information processing request having a higher priority and the information processing device becomes equal to or smaller than a predetermined value, the priorities stored in the storage unit in association with the first information processing request and the second information processing request such that the second information processing request having the lower priority is processed earlier than the first information processing request having the higher priority.

An information processing system includes: a terminal device; an information processing device; and a server device. The terminal device detects and transmits a current position at predetermined timings after transmitting an information processing request. The information processing device includes: a storage processing unit that receives the information processing request transmitted from the terminal device and then stores the information processing request and a priority for executing the information processing request in a storage unit in association with each other; an information processing unit that executes information processing requests stored in the storage unit in order from an information processing request in association with which a higher priority is stored; a moving speed calculation unit that calculates a moving speed of the terminal device based on, out of positional information transmitted at the predetermined timings from the terminal device that has transmitted the information processing request, first positional information transmitted at a first timing and second positional information transmitted at a second timing subsequent to the first positional information; a time calculation unit that calculates a time until a distance between the terminal device and the information processing device becomes equal to or smaller than a predetermined value based on the moving speed calculated by the moving speed calculation unit, positional information of the information processing device, and the second positional information; and a replacement processing unit that replaces, when a second time as a time until the distance between a second terminal device that has transmitted a second information processing request having a lower priority and the information processing device becomes equal to or smaller than a predetermined value is shorter than a first time as a time until the distance between a first terminal device that has transmitted a first information processing request having a higher priority and the information processing device becomes equal to or smaller than a predetermined value, the priorities stored in the storage unit in association with the first information processing request and the second information processing request such that the second information processing request having the lower priority is processed earlier than the first information processing request having the higher priority. The server device receives the information processing request and the detected current position from the terminal device and transmits the information processing request and the detected current position to the information processing device.

An information processing method is performed by an information processing device. The method includes: by a storage processing unit, receiving an information processing request transmitted from a terminal device and then storing the information processing request and a priority for executing the information processing request in a storage unit in association with each other; by an information processing unit, executing information processing requests stored in the storage unit in order from an information processing request in association with which a higher priority is stored; by a moving speed calculation unit, calculating a moving speed of the terminal device based on, out of positional information transmitted at predetermined timings from the terminal device that has transmitted the information processing request, first positional information transmitted at a first timing and second positional information transmitted at a second timing subsequent to the first positional information; by a time calculation unit, calculating a time until a distance between the terminal device and the information processing device becomes equal to or smaller than a predetermined value based on the moving speed calculated by the moving speed calculation unit, positional information of the information processing device, and the second positional information; and by a replacement processing unit, when a second time as a time until the distance between a second terminal device that has transmitted a second information processing request having a lower priority and the information processing device becomes equal to or smaller than a predetermined value is shorter than a first time as a time until the distance between a first terminal device that has transmitted a first information processing request having a higher priority and the information processing device becomes equal to or smaller than a predetermined value, replacing the priorities stored in the storage unit in association with the first information processing request and the second information processing request such that the second information processing request having the lower priority is processed earlier than the first information processing request having the higher priority.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic diagram for explaining replacement processing of the print jobs in the information processing system according to the first embodiment;

FIG. 7 is a diagram for explaining replacement determination of priority of the print job in the information processing system according to the first embodiment;

DETAILED DESCRIPTION OF THE PREFERRED EMBODIMENTS

The following describes in detail an information processing system according to embodiments to which the present invention is applied with reference to the attached drawings. In the following description, the information processing system is assumed to process a print job as an example of an information processing request. However, information to be processed may be other than the print job. For example, the information processing may be scan starting processing or setting processing with a scanner function, facsimile transmission processing or setting processing with a facsimile function, or the like. The description will be made assuming that an image and/or the like corresponding to the print job are printed on a sheet to be output. However, information such as the print job may be output to a storage medium such as a semiconductor memory.

Outline

In the information processing system according to an embodiment, a multifunction peripheral (MFP) that can be remotely controlled by a portable terminal device acquires, at predetermined timings (for example, periodically), positional information of a portable terminal device that has transmitted a print job. The MFP detects a moving speed from the positional information of a user. If the print job of a user positioned near the MFP can be completed by the time when a user at a distant place comes to collect printed matter, the MFP processes the print job of the user at the near place in preference to the print job of the user at the distant place.

Due to this, the print job of the user near the MFP can be executed by the time when the user at a place distant from the MFP comes to collect the printed matter. Accordingly, the time until the user at the place distant from the MFP comes to collect the printed matter can be effectively utilized, the user near the MFP can be prevented from wastefully waiting, and efficient processing of the print job can be achieved.

First Embodiment

Figure 1:
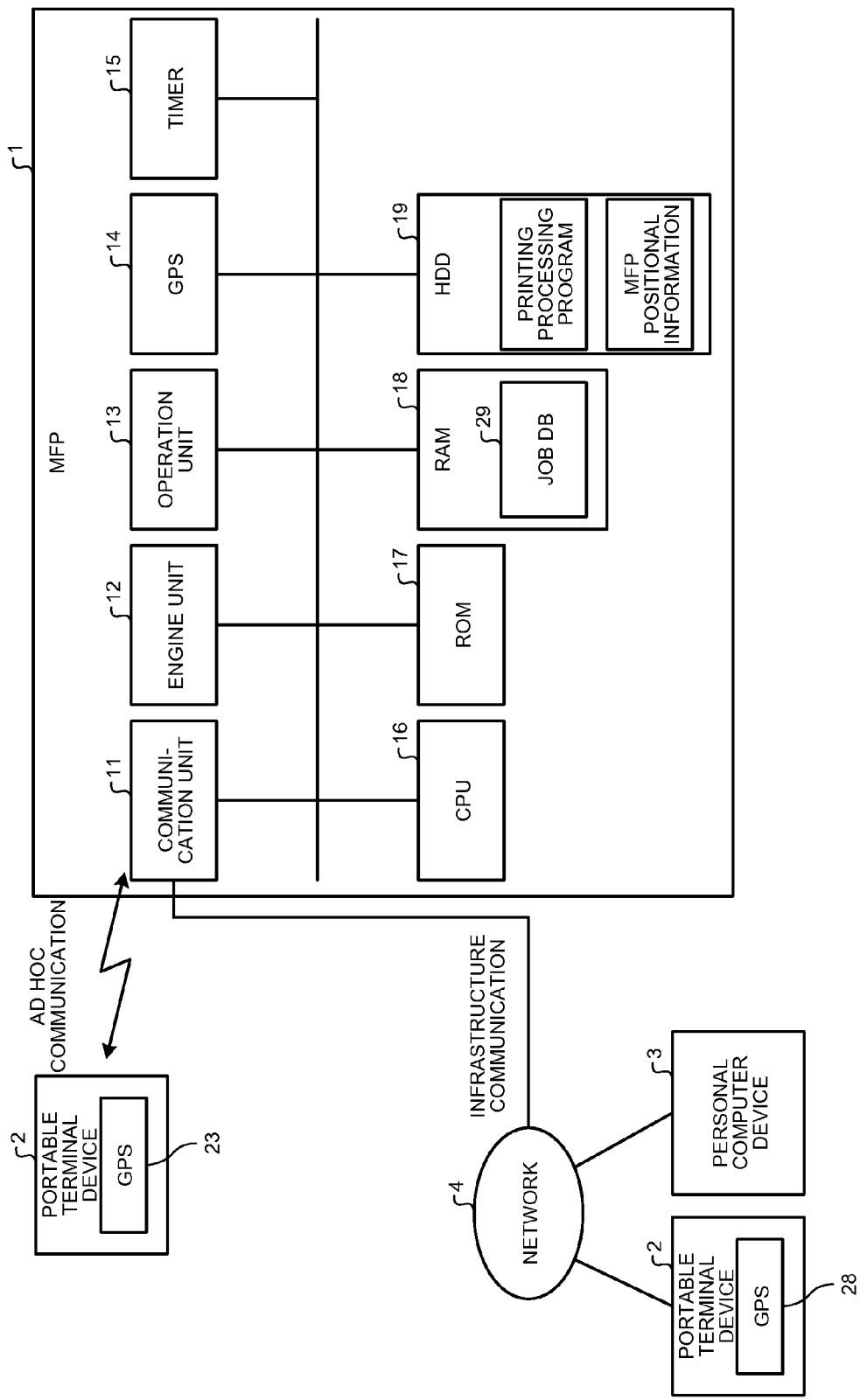
FIG. 1 is a system configuration diagram of an information processing system according to a first embodiment to which the present invention is applied.

FIG. 1 is a system configuration diagram of an information processing system according to a first embodiment. The information processing system according to the first embodiment includes an MFP 1 and terminal devices. The terminal devices include a portable terminal device 2 and a personal computer device 3. The portable terminal device 2 is an example of the terminal device, and communicates with the MFP 1 through ad hoc communication. Alternatively, the portable terminal device 2 communicates with the MFP 1 via a predetermined network 4 such as the Internet through infrastructure communication.

The MFP 1 includes a communication unit 11, an engine unit 12, an operation unit 13, a GPS 14, a timer 15, a CPU 16, a ROM 17, a RAM 18, and an HDD 19. The communication unit 11 has both of a wireless communication function and a wired communication function, and performs the ad hoc communication or the infrastructure communication described above between itself and the portable terminal device 2 and the personal computer device 3. The engine unit 12 as an example of an information processing unit has various functions related to image formation and/or the like such as a printing function, a scanner function, a facsimile function, and a copying function, and executes a function designated by a user or the like. The engine unit 12 causes a character, an image, and/or the like to be printed on a physical medium such as a paper medium. The engine unit 12 may cause information to be output to a storage medium such as a semiconductor memory.

The operation unit 13 is what is called a touch panel. On the operation unit 13, displayed is an icon for selecting a desired function, an icon for instructing a desired setting, and/or the like. The user performs touch operation on a desired icon. The MFP 1 performs information processing corresponding to the icon displayed at a touch operation position. GPS is an abbreviation for a "global positioning system". The GPS 14 detects a present position of the MFP 1. MFP positional information representing the detected present position of the MFP 1 is used by the CPU 16 to calculate a moving distance of the portable terminal device 2, for example. Alternatively, the GPS 14 detects the present position of the MFP 1 in advance. The detected present position is stored in the HDD 19 as the MFP positional information. The MFP positional information may be manually input, for example. The CPU 16 reads out the MFP positional information stored in the HDD 19 and uses it for calculating the moving distance of the portable terminal device 2, for example. The GPS 14 is an example of a position acquisition unit. The CPU 16 is an example of a storage processing unit. The HDD 19 is an example of a storage unit.

The timer 15 counts a time corresponding to an interval for performing replacement processing of priorities of print jobs. As described later as an example, the MFP 1 periodically acquires the present position of the portable terminal device 2 or the like, calculates a distance therefrom, and replaces priorities of print jobs with each other. The timer 15 counts the time corresponding to the interval for performing such replacement processing.

CPU is an abbreviation for a "central processing unit". The CPU 16 controls the entire operation of the MFP 1 in addition to replacement control of the priorities of the print jobs described later. ROM is an abbreviation for a "read only memory". The ROM 17 stores a predetermined computer program such as an operation system for performing basic operation control on the CPU 16. RAM is an abbreviation for a "random access memory". The RAM 18 stores a job database (job DB) 29. The RAM 18 may be used as an example of the storage unit. The job DB 29 stores the print jobs to which the priorities (described later) are given. The job DB 29 may be stored in another storage unit such as the ROM 17 and the HDD 19. HDD is an abbreviation for a "hard disk drive". The HDD 19 stores a printing processing program 19 that processes the print job while replacing the priorities of the print jobs depending on the distance between the MFP 1 and the portable terminal device 2 or the like. The HDD 19 stores the MFP positional information described above. The printing processing program and the MFP positional information may be stored in another storage unit such as the ROM 17 and the RAM 18.

The printing processing program may be recorded and provided in a computer-readable recording medium such as a compact disc read only memory (CD-ROM) and a flexible disk (FD) as an installable or executable file. Alternatively, the printing processing program may be recorded and provided in a computer-readable recording medium such as a compact disc recordable (CD-R), a digital versatile disc (DVD), a Blu-ray Disc (registered trademark), and a semiconductor memory. DVD is an abbreviation for a "digital versatile disc". The printing processing program may be provided to be installed via a network such as the Internet. The printing processing program may be embedded in advance and provided in a ROM or the like in a device.

Figure 2:
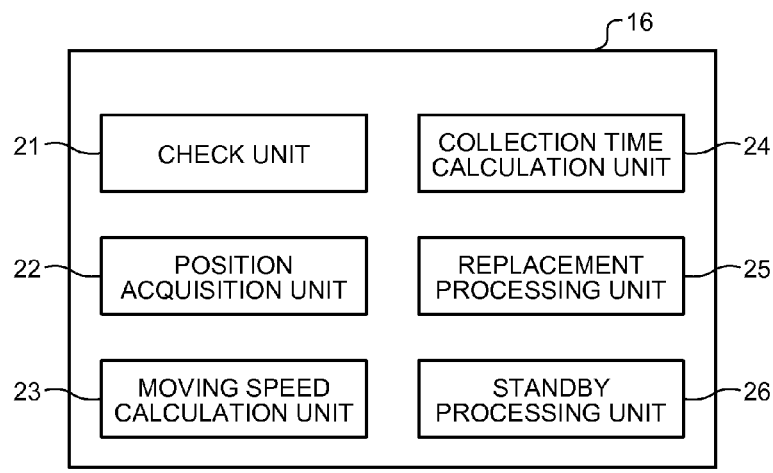
FIG. 2 is a functional block diagram of an MFP of the information processing system according to the first embodiment.

FIG. 2 is a functional block diagram of each function implemented when the CPU 16 operates according to the printing processing program. As illustrated in FIG. 2, the CPU 16 operates according to the printing processing program to implement, as software, respective functions of a check unit 21, a position acquisition unit 22, a moving speed calculation unit 23, a collection time calculation unit 24, a replacement processing unit 25, and a standby processing unit 26. In this example, from the check unit 21 to the standby processing unit 26 are assumed to be implemented as software. However, some or all of the check unit 21 to the standby processing unit 26 may be implemented as hardware.

The check unit 21 checks the number of print jobs currently stored in the job DB 29. The position acquisition unit 22 acquires the positional information of each portable terminal device 2 and the personal computer device 3. The moving speed calculation unit 23 as an example of a moving speed detection unit calculates the moving speed of each portable terminal device 2. The collection time calculation unit 24 as an example of a time calculation unit calculates a collection time for the printed matter that is estimated from the present position and the moving speed of each portable terminal device 2. The replacement processing unit 25 performs processing for replacing the priorities of the print jobs stored in the job DB 29 according to the estimated collection time and the like. The standby processing unit 26 controls the replacement processing to be in a standby state from when the replacement processing of priorities is performed until the next replacement processing is performed.

Figure 3:
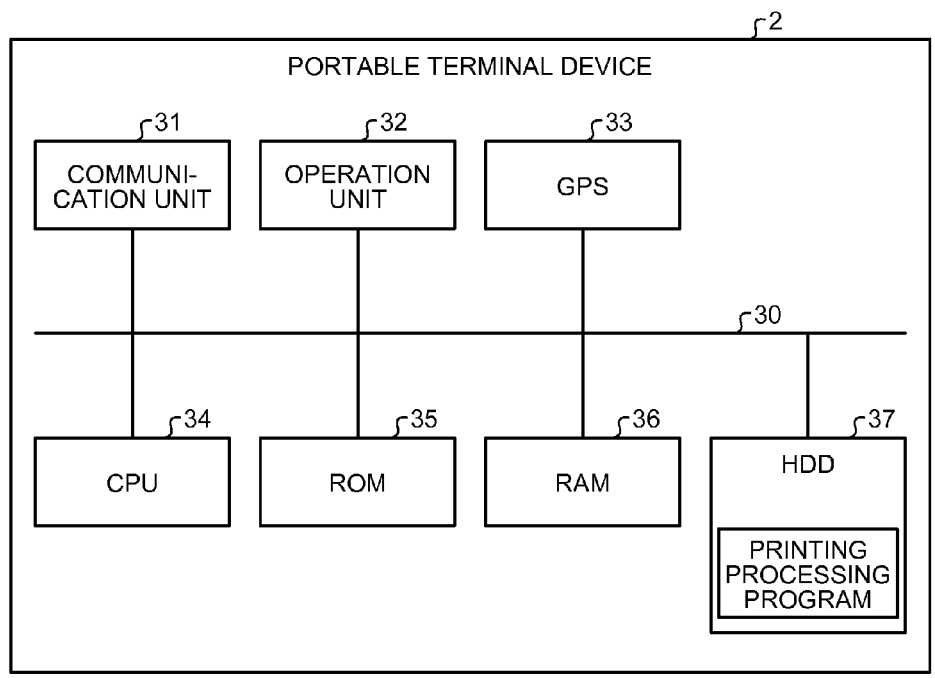
FIG. 3 is a block diagram of a portable terminal device of the information processing system according to the first embodiment.

FIG. 3 is a hardware configuration diagram of the portable terminal device 2. The portable terminal device 2 includes a communication unit 31, an operation unit 32, a GPS 33, a CPU 34, a ROM 35, a RAM 36, and an HDD 37. From the communication unit 31 to the HDD 37 are connected to each other via a bus line 30. The communication unit 31 performs ad hoc communication or infrastructure communication between itself and the MFP 1. The operation unit 32 is what is called a touch panel. On the operation unit 32, displayed is an icon or the like for performing a desired operation such as a print setting and a print instruction for the printed matter. The user performs touch operation on a desired icon. The CPU 34 transmits a command such as a print instruction corresponding to the touch-operated icon to the MFP 1 using the ad hoc communication or the infrastructure communication.

The GPS 23 detects the present position of the portable terminal device 2 periodically or when having received a transmission request from the MFP 1. The CPU 34 transmits the detected present position to the MFP 1 via the communication unit 31. In this case, every time when the GPS 23 detects the present position, the CPU 34 compares the detected present position with the position detected in the last time. Only when a difference between the former and latter positions is equal to or larger than a predetermined difference (equal to or larger than a predetermined moving distance), the CPU 34 transmits the present position to the MFP 1. This configuration can prevent the same present position from being wastefully transmitted to the MFP 1 when the present position of the portable terminal device 2 has not moved because the user is standing still. The CPU 34 also controls the entire portable terminal device 2.

The ROM 35 stores a computer program such as an operation system of the portable terminal device 2. The CPU 34 operates according to an operation program to control an operation of the portable terminal device 2. The HDD 37 stores a printing processing program for a portable terminal device for printing the printed matter by remotely controlling the MFP 1. When the instruction to print the printed matter is given by the user, the CPU 34 loads the printing processing program on the RAM 36 to execute it, and transmits the present position of the portable terminal device 2, for example.

Figure 4:
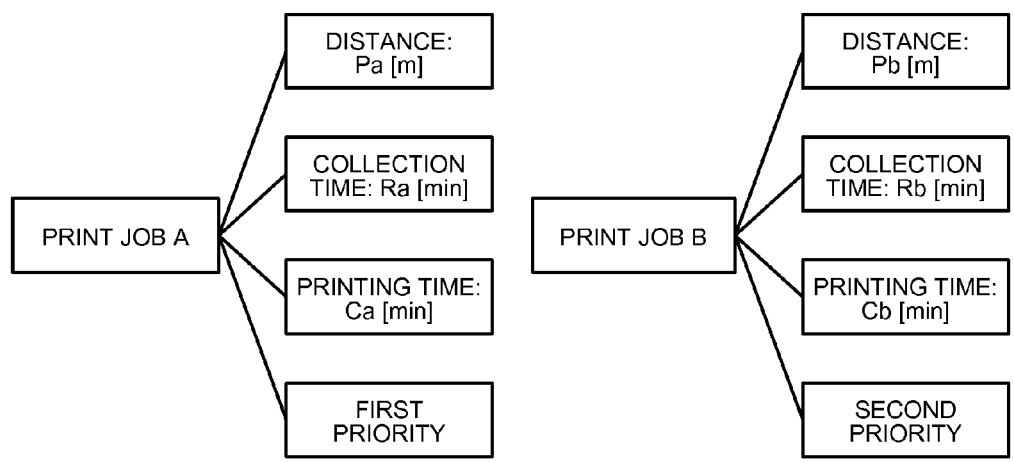
FIG. 4 is a diagram illustrating an example of a format of a print job used in the information processing system according to the first embodiment.

FIG. 4 is a diagram illustrating a configuration of the print job stored in the job DB 29 in the RAM 18 of the MFP 1. As illustrated in FIG. 4, a "distance" between the MFP 1 and the portable terminal device 2 (or the personal computer device 3) that has transmitted the print job is calculated and added to each print job in addition to basic printing information such as the number of sheets to be printed and print colors. A "printing time" estimated from the number of print copies and the printing speed of the print job is also calculated and added thereto. Also added thereto is a "collection time" that is a time until the user comes to collect the printed matter and estimated from the positional information of the portable terminal device 2 or the like acquired in the last time and the positional information of the portable terminal device 2 or the like acquired in this time. Additionally, also added thereto is a "priority" that is given corresponding to the "distance", the "collection time", the "printing time", and/or the like.

The example of FIG. 4 illustrates a case in which, regarding a print job A, the distance between the portable terminal device 2 and the MFP 1 is Pa (m), the estimated collection time is Ra (min), the estimated printing time is Ca (min), and the first priority is given thereto. Similarly, regarding a print job B, the distance between the portable terminal device 2 and the MFP 1 is Pb (m), the estimated collection time is Rb (min), the estimated printing time is Cb (min), and the second priority is given thereto. A "receiving time" of each print job may be added to each print job together with the "distance", the "collection time", the "printing time", and the "priority".

FIG. 5 is a diagram schematically illustrating a storage form of the print job stored in the job DB 29 (print job queue) in the RAM 18. The CPU 16 receives the print job transmitted from the portable terminal device 2, and receives the print job input via the operation unit 13. The CPU 16 operates as an example of a storage processing unit to add the priorities to the print jobs in a received order as illustrated in FIG. 5, and controls the print jobs to be stored in the job DB 29. The CPU 16 checks the job DB 29 after the print job being currently executed is completed. If there is any print job stored therein, the CPU 16 processes the print job in the order of priority.

The CPU 16 revises the priority according to the "distance", the "collection time", the "printing time", and/or the like described above. When the replacement processing of priorities is required, the CPU 16 performs replacement processing for causing the print job to which a lower priority is given to have a higher priority. The example of FIG. 5 illustrates a case in which a third print job having the third priority is replaced with a fourth print job having the fourth priority.

Figure 6A:
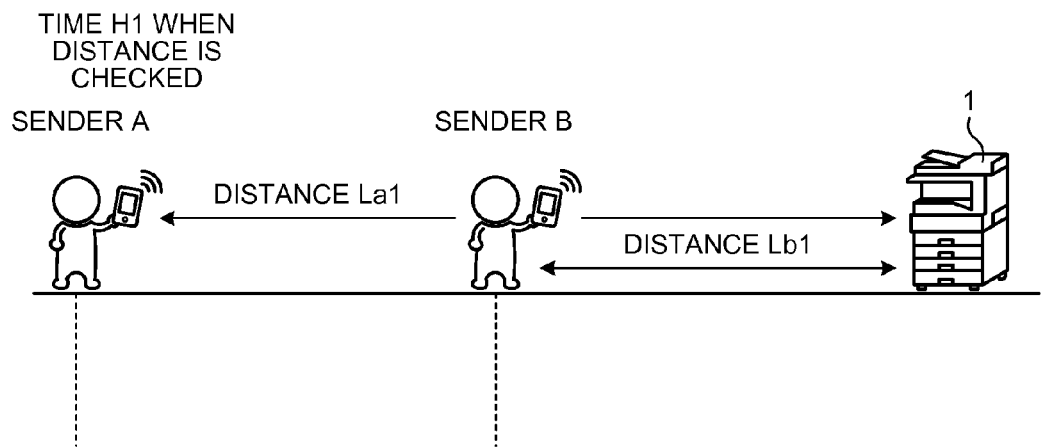
FIG. 6A is a diagram for explaining a distance between a sender of the print job and the MFP.
Figure 6B:
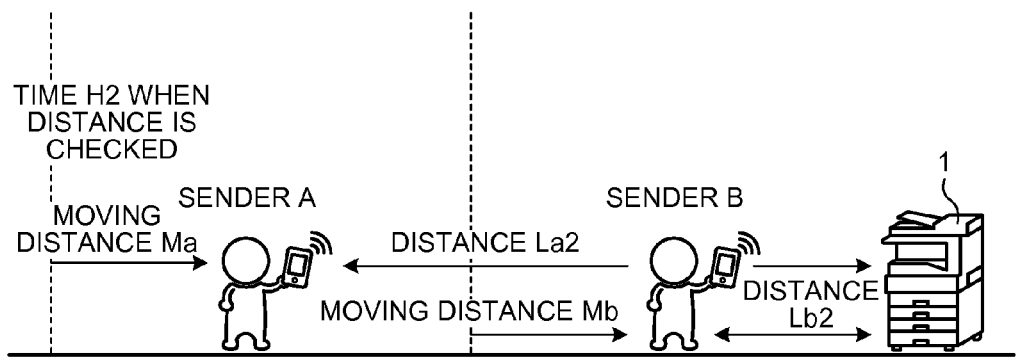
FIG. 6B is a diagram for explaining a moving distance of the sender of the print job.

Next, FIGS. 6A and 6B are diagrams for explaining information used by the MFP 1 for replacing the priorities of printing. The MFP 1 periodically acquires the present position of the portable terminal device 2 or the like that has transmitted the print job using the ad hoc communication or the infrastructure communication as described above. At a certain time H1, the MFP 1 calculates the distance between the portable terminal device 2 and the MFP 1 based on the present position of the portable terminal device 2 or the like and the present position of the MFP 1. The MFP 1 handles the calculated distance as a distance L to a sender (portable terminal device 2) of the print job.

The MFP 1 periodically calculates the distance L to the sender (portable terminal device 2). A difference between a distance L1 to the sender that is first calculated at the time H1 and a distance L2 to the sender that is calculated next at a time H2 is a moving distance M of the sender (M=L2−L1). A value obtained by dividing the moving distance M by a time (H2−H1) between when the present positions of the portable terminal device 2 have been acquired is a moving speed V of the sender. A value obtained by dividing the distance L by the moving speed V is an estimated time T until the sender comes to collect the printed matter.

The MFP 1 updates such pieces of information every time when acquiring the present position of the portable terminal device 2, and adds the pieces of information to the corresponding print job to store them in the job DB 29. The MFP 1 performs replacement determination of priorities of the print jobs using these pieces of information, the N-th priority of the print job, and a processing time C of the print job. The MFP 1 performs replacement processing of the priorities of the print jobs according to a result of the replacement determination.

FIG. 7 is a diagram for explaining the replacement determination of the priorities of the print jobs. The MFP 1 processes the print jobs in the received order in principle. That is, the MFP 1 preferentially processes the print job that has been transmitted earlier. However, when it is estimated that the user that has transmitted the print job later will come to collect the printed matter earlier than the user that has transmitted the print job earlier (the former user will come to collect the printed matter in a short time), the MFP 1 performs processing of replacing the priorities of both print jobs. Due to this, the printed matter of the user that has transmitted the print job later can be printed in a time period until the user that has transmitted the print job earlier comes to collect the printed matter, so that efficient printing processing can be performed.

In this case, the printed matter of the user that has transmitted the print job later may be printed in a time period until the user that has transmitted the print job earlier comes to collect the printed matter. However, when a total time required for printing the earlier print job and the later print job is longer than the time until the user that has transmitted the print job earlier comes to collect the printed matter, the user that has transmitted the print job earlier inconveniently reaches the MFP 1 before printing corresponding to the earlier print job is completed. In this case, the user that has transmitted the print job earlier needs to wait in front of the MFP 1 until the printing corresponding to the print job of himself/herself is completed. Due to this, if the replacement processing of the priorities causes the user that has transmitted the print job earlier to wait, or causes a waiting time to be longer, the MFP 1 does not perform replacement processing of the priorities as described below. Accordingly, intelligent replacement processing is performed.

A specific description will be provided below. A print collection time for a sender A of the print job is assumed to be "Ta", and the print collection time for a sender B of the print job is assumed to be "Tb". The priority of the sender A is assumed to be "Na", and the priority of the sender B is assumed to be "Nb". A printing processing time for the print job of the sender A is assumed to be "Ca", and the printing processing time for the print job of the sender B is assumed to be "Cb".

For example, when a first condition of "the print collection time Ta for the sender A>the print collection time Tb for the sender B" is established as illustrated in FIG. 7 as a first situation, it is estimated that the sender B will collect the printed matter earlier than the sender A. When a second condition of "the priority Na of the sender A>the priority Nb of the sender B" is established, the priority of the sender A is higher than the priority of the sender B. When a time obtained by subtracting the printing processing time "Ca" for the print job of the sender A and the printing processing time "Cb" for the print job of the sender B from the print collection time "Ta" of the sender A is equal to or larger than 0 (Ta−Cb−Ca≥0), the following can be said. That is, in this case, the sender A having a higher priority does not need to wait even if the print job A and the print job B are processed. In the first situation under the first to third conditions, the MFP 1 performs processing of replacing the print job of the sender A having a higher priority with the print job of the sender B having a lower priority.

Similarly, when the first condition of "the print collection time Ta for the sender A>the print collection time Tb for the sender B" is established as illustrated in FIG. 7 as a second situation, it is estimated that the sender B will collect the printed matter earlier than the sender A. When the second condition of "the priority Na of the sender A>the priority Nb of the sender B" is established, the priority of the sender A is higher than the priority of the sender B. When the time obtained by subtracting the printing processing time "Ca" for the print job of the sender A and the printing processing time "Cb" for the print job of the sender B from the print collection time "Ta" of the sender A is less than 0 (Ta−Cb−Ca<0), the following can be said. That is, in this case, the sender A having a higher priority needs to wait when the print job A and the print job B are processed. In the second situation under the first to third conditions, the MFP 1 does not perform processing of replacing the print job of the sender A with the print job of the sender B.

The MFP 1 performs such replacement determination of the priorities and replacement processing of the priorities at a timing of updating the print job (timing of acquiring the present position of each portable terminal device or the like) between adjacent print jobs in the job DB 29 (print job queue).

Figure 8:
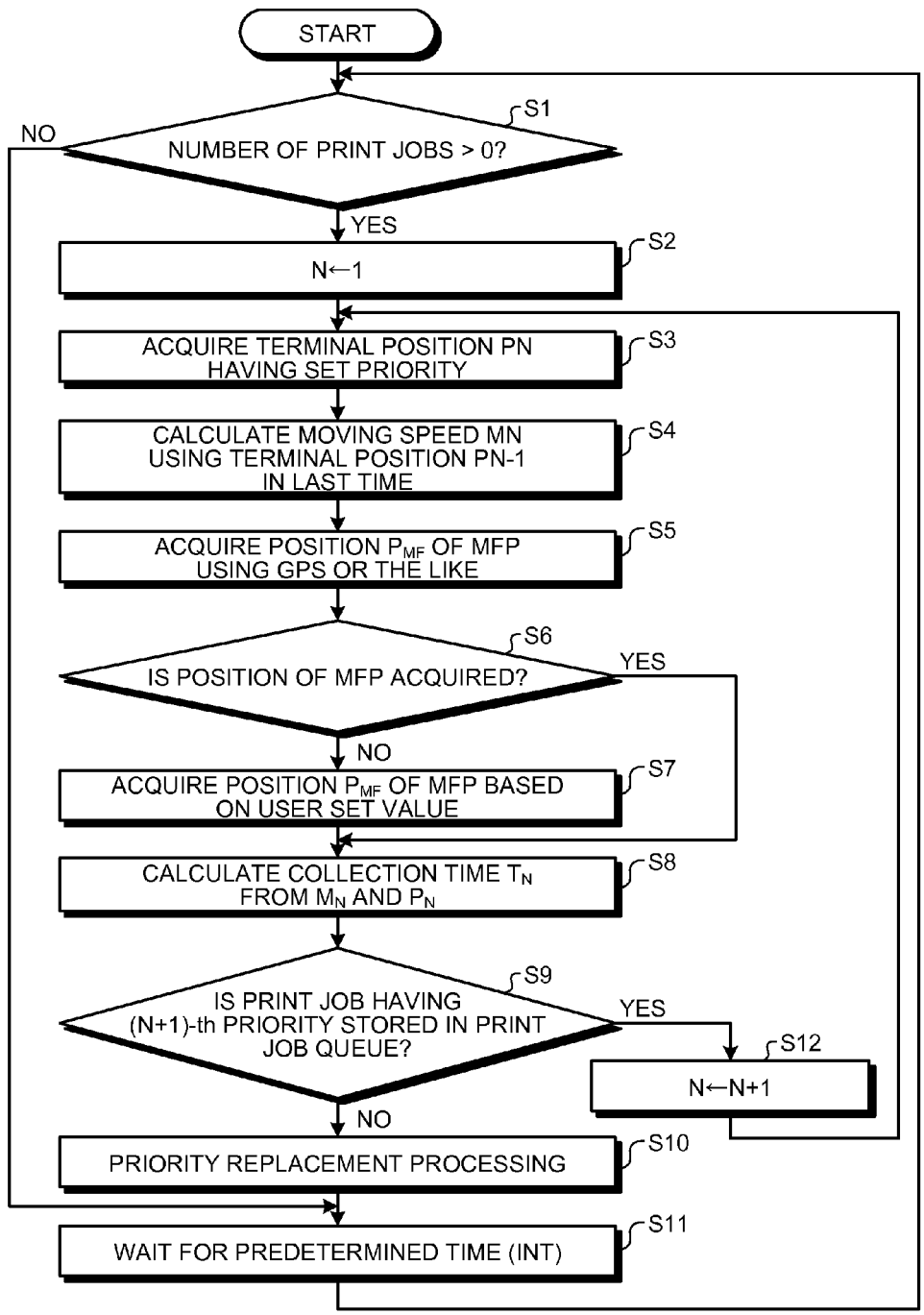
FIG. 8 is a flowchart illustrating a procedure of replacement processing of the priorities of the print jobs in the information processing system according to the first embodiment.

FIG. 8 is a flowchart illustrating a procedure of update processing of the print job stored in the job DB 29 in the RAM 18. The CPU 16 of the MFP 1 reads the printing processing program stored in the HDD 19 to load the components 21 to 26 illustrated in FIG. 2 on the RAM 18 and causes the components to function.

First, at Step S1, the check unit 21 illustrated in FIG. 2 checks the number of the print jobs stored in the job DB 29 in the RAM 18. If the number of the print jobs stored in the job DB 29 is "0" (the number of the print jobs >0), the process proceeds to Step S11. At Step S11, the standby processing unit 26 counts the time being kept by the timer 15 illustrated in FIG. 1 corresponding to the time allocated as an interval (Int) between pieces of update processing of the print job to cause the update processing to be in a standby state. When the time corresponding to the interval is counted, the update processing returns to Step S1, and the check unit 21 checks the number of the print jobs stored in the job DB 29 again.

Next, when it is determined that one or more print jobs are stored in the job DB 29 and the process proceeds to Step S2, the position acquisition unit 22 sets a number for designating the portable terminal device 2 (or the personal computer device 3) the present position of which is acquired to be "1" (N←1). By way of example, the MFP 1 sequentially performs update processing from the print job having the first priority. Due to this, in performing update processing for the first time, information of "N←1" is stored in the RAM 18 or the like for designating the update processing of the print job having the first priority. As described later in the description of Step S12, every time when the update processing is performed on one print job, the position acquisition unit 22 increments the number for designating the update processing of the print job one by one, as follows: N=1→N=2→N=3 . . . . Accordingly, the update processing is performed in the order of priority of each print job.

Next, at Step S3, the position acquisition unit 22 acquires the present position of the portable terminal device 2 or the like that has transmitted the print job having the priority corresponding to the set number N. Specifically, when having received a print request from the portable terminal device 2, the MFP 1 issues unique identification information to the portable terminal device 2 together with a message that the print request has been received.

After transmitting the print job to the MFP 1, the CPU 34 of each portable terminal device 2 illustrated in FIG. 3 detects the present position of itself via the GPS 33 every predetermined time (every interval time described above) according to the printing processing program stored in the HDD 37. The CPU 34 of the portable terminal device 2 then adds the identification information issued from the MFP 1 to the detected present position of itself, and transmits the information to the MFP 1 via the communication unit 31. The position acquisition unit 22 of the MFP 1 acquires, at Step S3, the present position of each portable terminal device 2 that is periodically transmitted from the portable terminal device 2 or the like.

At Step S4, the moving speed calculation unit 23 performs an operation of Expression 1 as follows to calculate the moving speed "MN" of the portable terminal device 2 assuming that the position of the portable terminal device 2 acquired in the last time is "PN−1", the currently acquired present position of the same portable terminal device 2 is "PN", and the interval for performing update processing is "Int".

$$MN = ((PN-1) - PN)/\text{Int} \qquad \text{(Expression 1)}$$

At first, the position (PN−1) acquired in the last time is not present, so that the process at Step S4 performed by the moving speed calculation unit 23 is skipped.

Next, at Step S5, the position acquisition unit 22 acquires a present position PMF of the MFP 1 via the GPS 14 illustrated in FIG. 3. At Step S6, it is determined whether the position acquisition unit 22 has acquired the present position PMF of the MFP 1. If it is determined that the present position PMF has been acquired (Yes at Step S6), the process proceeds to Step S8. If it is determined that the position acquisition unit 22 cannot acquire the present position PMF of the MFP 1 (No at Step S6), the process proceeds to Step S7.

At Step S7, the position acquisition unit 22 reads out and acquires the present position of the MFP 1 that is detected by the GPS 14 in advance and stored in the storage unit such as the RAM 36 and the HDD 37 because the GPS 14 cannot acquire the present position PMF of the MFP 1. Alternatively, at Step S7, the position acquisition unit 22 reads out and acquires the present position of the MFP 1 that is stored in the storage unit such as the RAM 36 and the HDD 37 in advance via the operation unit 13 or the like by the user.

At Step S8, the collection time calculation unit 24 performs an operation of Expression 2 as follows to calculate a collection time "TN" until the user of the portable terminal device 2 comes to collect the printed matter assuming that the moving speed of the portable terminal device 2 is "MN", the currently acquired present position of the portable terminal device 2 is "PN", and the present position of the MFP 1 is "PMF". The collection time "TN" is an example of a time until the distance between the MFP 1 and the portable terminal device 2 becomes equal to or smaller than a predetermined value.

$$TN = (PMF - PN)/MN \qquad \text{(Expression 2)}$$

Next, at Step S9, the check unit 21 determines whether the print job having the (N+1)-th priority is present in the job DB 29. In other words, the check unit 21 determines whether another print job the update processing on which should be examined is stored in the job DB 29. If it is determined that the other print job is stored (Yes at Step S9), at Step S12, the check unit 21 increments a current number for designating the update processing of the print job by one to shift the print job the update processing on which should be examined to the print job having the next priority. That is, "1" is added to the current number for designating the update processing of the print job, and the process is returned to Step S3 after the value to which "1" has been added is set to "N". Accordingly, the print job the present position of which is acquired is shifted in the order of priority as follows: the print job having the first priority→the print job having the second priority→the print job having the third priority . . . .

Next, if the check unit 21 determines that the other print job is not stored in the job DB 29 (No at Step S9), the replacement processing unit 25 replaces the priorities of the print jobs using the flowchart in FIG. 9 according to a result of replacement determination described later (Step S10).

At Step S11, the standby processing unit 26 counts the time being kept by the timer 15 illustrated in FIG. 1 corresponding to the time allocated as the interval (Int) between pieces of update processing of the print job to cause the update processing to be in a standby state. When the time corresponding to the interval is counted, the update processing returns to Step S1, and the check unit 21 checks the number of the print jobs stored in the job DB 29 again.

Figure 9:
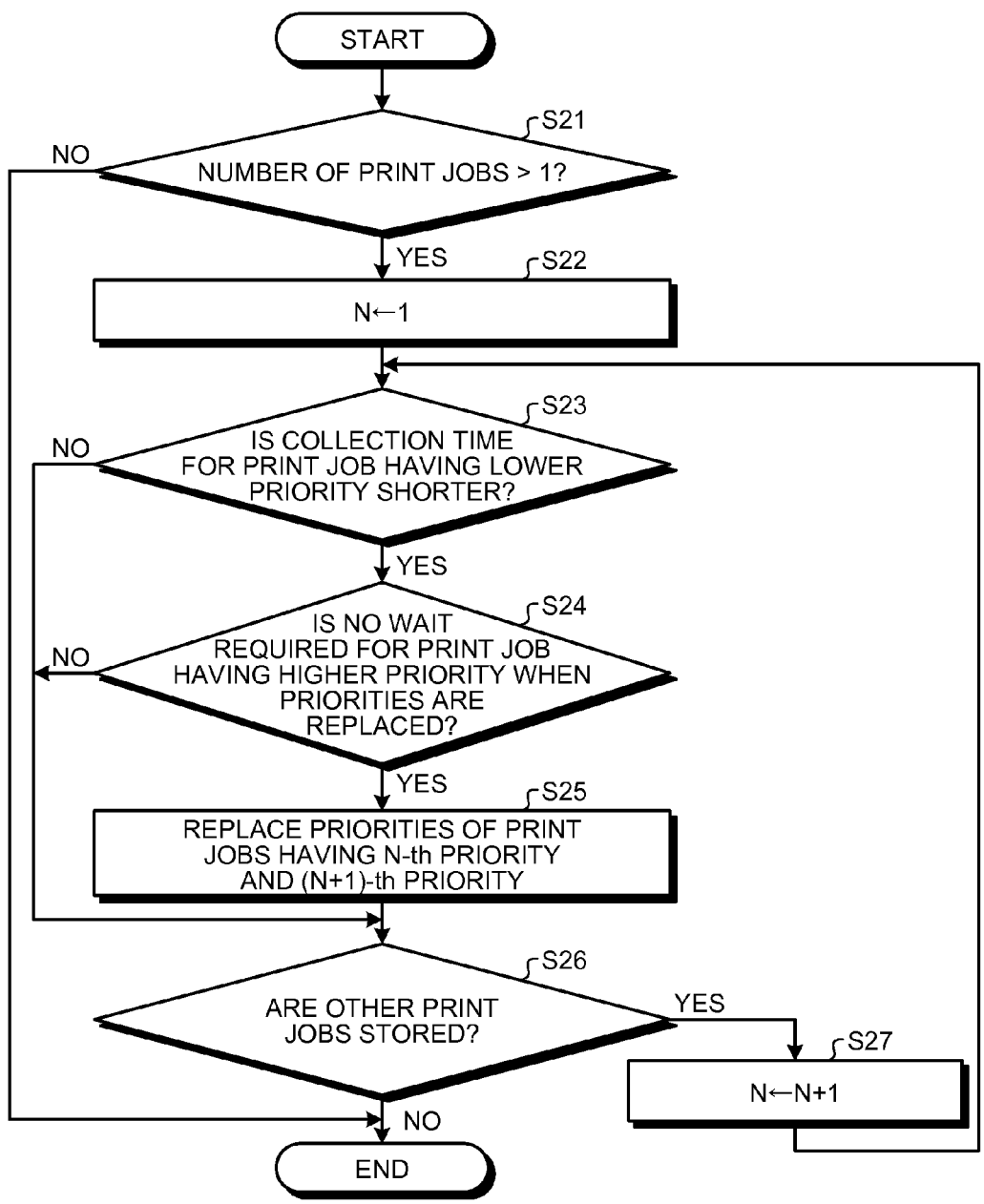
FIG. 9 is a flowchart illustrating a procedure of replacement determination processing of the priorities of the print jobs in the information processing system according to the first embodiment.

Next, the flowchart in FIG. 9 illustrates a procedure of replacement determination processing of the priorities for determining whether to perform replacement processing of the priorities. First, at Step S21, the check unit 21 checks the number of the print jobs stored in the job DB 29. If the number of the print jobs stored in the job DB 29 is equal to or smaller than 1 (No at Step S21), the replacement processing of the priorities of the print jobs is not required, so that the process of the flowchart in FIG. 9 is ended as it is. On the other hand, when the number of the print jobs stored in the job DB 29 is equal to or larger than 2 (Yes at Step S21), the process proceeds to Step S22.

At Step S22, the replacement processing unit 25 sets, to be "1", the number for designating the print job on which priority replacement determination is performed (1←N). By way of example, the replacement processing unit 25 performs replacement determination sequentially from the print job having the first priority. Due to this, in performing update processing for the first time, the information of "N←1" is stored in the RAM 18 or the like to designate replacement determination processing of the print job having the first priority. As described later in the description of Step S27, every time when the replacement determination is performed on one print job, the replacement processing unit 25 increments the number for designating the print job on which the replacement determination is performed one by one, as follows: N=1→N=2→N=3 . . . . Accordingly, the replacement determination is performed in the order of priority of each print job.

Next, at Step S23, as described above with reference to FIG. 5, the replacement processing unit 25 compares the collection times of the adjacent print jobs with each other, and determines whether the collection time for the print job having a lower priority is shorter. For example, the collection time TN for the printed matter corresponding to the print job having the first priority is compared with the collection time TN+1 for the printed matter corresponding to the print job having the second priority. In this case, at Step S23, the replacement processing unit 25 determines whether the collection time (TN+1) for the printed matter corresponding to the print job having the second priority is shorter than the collection time (TN) for the printed matter corresponding to the print job having the first priority (TN>TN+1).

If it is determined that the collection time for the print job having a lower priority is longer (No at Step S23), the replacement processing of the priorities is not required, so that the process proceeds to Step S26. At Step S26, the check unit 21 determines whether another print job on which the replacement determination is not performed is stored in the job DB 29. If it is determined that the other print job on which the replacement determination is not performed is not stored (No at Step S26), the process of the flowchart in FIG. 9 is ended as it is.

On the other hand, if it is determined that the other print job on which the replacement determination is not performed is stored (Yes at Step S26), the process proceeds to Step S27. At Step S27, the replacement processing unit 25 increments the number for designating the print job by one to designate the print job on which the replacement determination is subsequently performed (N←N+1). Due to this, at Step S23, for example, the collection time for the print job having the second priority is compared with the collection time for the print job having the third priority, and it is determined whether the collection time for the print job having a lower priority is shorter.

On the other hand, at Step S23, if it is determined that the collection time for the print job having a lower priority is shorter (Yes at Step S23), the process proceeds to Step S24. At Step S24, it is determined whether the execution of the print job having a higher priority is inconveniently caused to be in a standby state when the replacement processing unit 25 has replaced the priorities of the print jobs. In this determination, the collection time for the print job having a higher priority is assumed to be "TN", the printing processing time for the printing job having the N-th priority is assumed to be "CN", and the printing processing time for the print job having the (N+1)-th priority subsequent to the N-th priority is assumed to be "CN+1". The replacement processing unit 25 then determines that the execution of the print job having a higher priority is not caused to be in a standby state by replacing the priorities of the print jobs (Yes at Step S24) if having determined that a condition of "TN−CN−CN+1≥0" is satisfied.

That is, when the collection time for the printed matter of the user corresponding to the print job having a higher priority is longer than a total time of the printing processing time for the print job having a higher priority and the printing processing time for the print job having the priority subsequent to the print job having a higher priority, the user corresponding to the print job having a higher priority can immediately collect the printed matter when he/she arrives even when the priorities are replaced with each other. Due to this, the replacement processing unit 25 advances the process to Step S25, and performs replacement processing of the priorities of the print jobs between the print job having a higher priority and the print job having the priority subsequent to the print job having a higher priority (refer to FIG. 5).

On the other hand, when the condition of "TN−CN−CN+1≥0" is not satisfied, the user corresponding to the print job having a higher priority will come to collect the printed matter while the print job having a higher priority and the print job having the priority subsequent to the print job having a higher priority are being executed. In this case, the replacement processing unit 25 makes a determination of "No" at Step S24, and advances the process to Step S26 without replacing the priorities.

At Step S26, the check unit 21 determines whether another print job on which the replacement determination is not performed is stored in the job DB 29. If it is determined that the other print job on which the replacement determination is not performed is not stored therein (No at Step S26), the process of the flowchart in FIG. 9 is ended as it is. On the other hand, if it is determined that the other print job on which the replacement determination is not performed is stored therein (Yes at Step S26), the process proceeds to Step S27. At Step S27, the replacement processing unit 25 increments, by one, the number N for designating the print job on which the priority replacement determination is subsequently performed (N←N+1), and returns the process to Step S23. Accordingly, the replacement determination is repeatedly performed.

As is obvious from the above description, in the information processing system according to the first embodiment, the MFP 1 sequentially adds the priorities to the print jobs transmitted via the portable terminal device 2 or input via the operation unit 13. The MFP 1 periodically acquires (monitors) the present position of the portable terminal device 2 (or the personal computer device 3) that has transmitted the print job. The MFP 1 uses the present position of the portable terminal device 2, the moving speed of the portable terminal device 2, the distance between the portable terminal device 2 and the MFP 1, the time required for executing the print job, and/or the like to determine whether the user that has transmitted the print job having a higher priority can immediately collect the printed matter when he/she arrives even when the print job having a lower priority is executed in a time period until the user that has transmitted the print job having a higher priority comes to collect the printed matter. If it is determined that the user that has transmitted the print job having a higher priority can immediately collect the printed matter when he/she arrives even when the print job having a lower priority is executed, the MFP 1 replaces the priorities of the print jobs.

Accordingly, for example, in a case in which the print job of the user at a position near the MFP 1 can be completed in a time period until the user at a distant place comes to collect the printed matter, the print job of the user at the near place can be processed in preference to the print job of the user at the distant place. Due to this, the time until the user at a place distant from the MFP 1 comes to collect the printed matter can be effectively utilized, the user near the MFP 1 can be prevented from wastefully waiting, and efficient processing of the print job can be achieved.

The MFP 1 periodically acquires the positional information and updates the priorities. Due to this, when the user B having a lower priority comes closer to the MFP 1 than the user A having a higher priority who is moving toward the MFP 1, the priority of the user B can be changed to be higher than the priority of the user A, and finer control can be achieved. Moreover, in this case, such finer control can be achieved even when an inexpensive GPS that detects the positional information in a two-dimensional range is used as the GPS 33 of the portable terminal device 2.

That is, for example, it is assumed that the MFP 1 is arranged on the first floor of a house, the user A is positioned on the fiftieth floor of the same house, and the user B is positioned on the third floor of the same house. In this case, based on three-dimensional positional information, the user B positioned on the third floor is closer to the MFP 1 placed on the first floor than the user A positioned on the fiftieth floor. However, with the GPS that has difficulty in detecting the positional information other than within the two-dimensional range, the distance between the user A and the MFP 1 and the distance between the user B and the MFP 1 are detected to be substantially the same. Even in such a case, when the positional information is periodically acquired as in the information processing system according to the embodiment, it can be detected that the user A is closer to the MFP 1 than the user B at the time when the user A goes down to the first floor from the fiftieth floor using an elevator and starts to walk toward the MFP 1, for example, and the priorities can be replaced with each other.

In this example, the portable terminal device 2 that has transmitted the print job periodically detects the positional information of itself and transmits it to the MFP 1. However, the portable terminal device 2 may be configured to transmit the positional information of itself when having received a transmission request of the positional information from the MFP 1. Also in this case, the same effect as described above can be obtained.

Second Embodiment

The following describes the information processing system according to a second embodiment of the present invention. In the information processing system according to the first embodiment described above, the MFP 1 directly communicates with the portable terminal device 2. On the other hand, in the information processing system according to the second embodiment, the MFP 1 communicates with the portable terminal device 2 via a server device.

Figure 10:
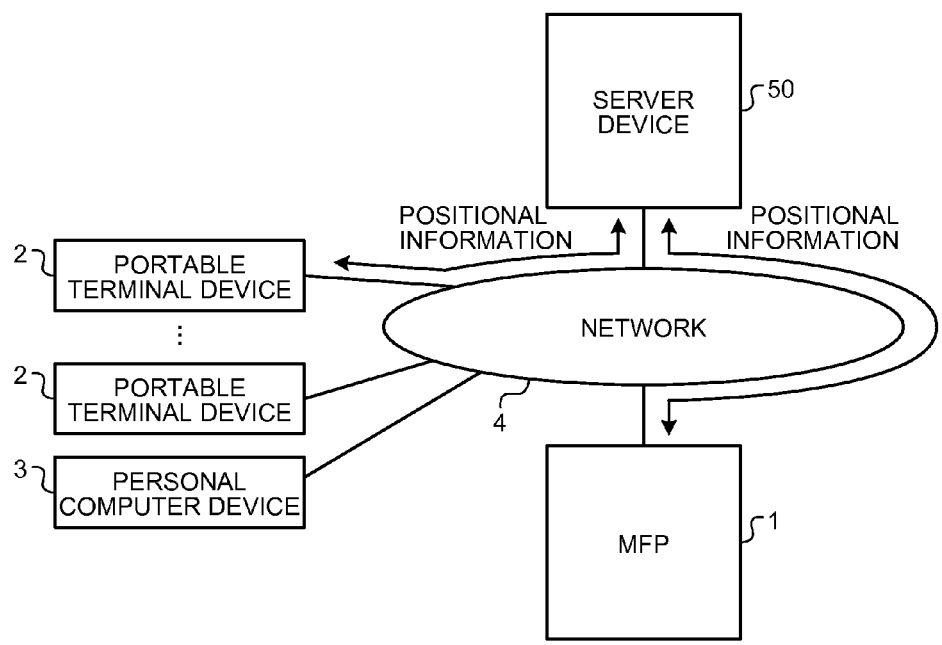
FIG. 10 is a system configuration diagram of an information processing system according to a second embodiment of the present invention.

FIG. 10 is a system configuration diagram of the information processing system according to the second embodiment. As illustrated in FIG. 10, in the information processing system according to the second embodiment, a server device 50 is provided on the network 4. The server device 50 mediates the communication between the MFP 1 and the portable terminal device 2.

Figure 11:
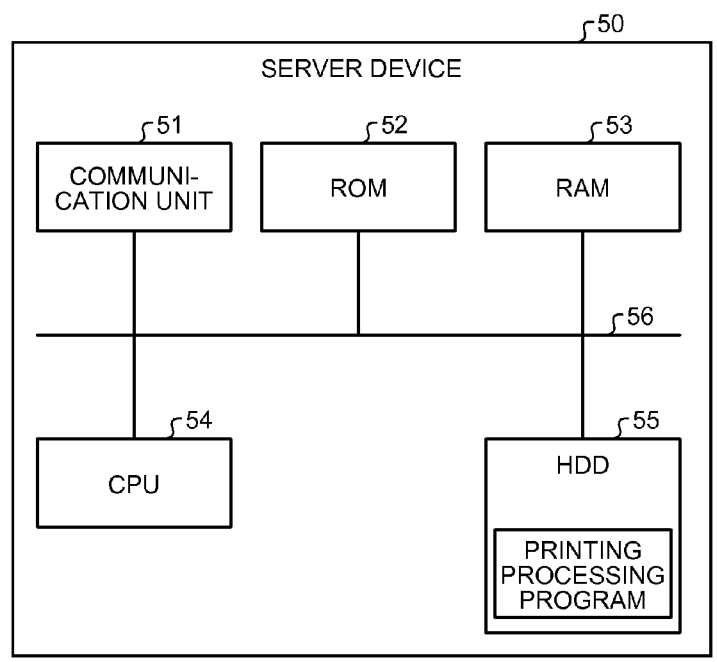
FIG. 11 is a hardware configuration diagram of a server device provided to the information processing system according to the second embodiment.

FIG. 11 is a hardware configuration diagram of the server device 50. As illustrated in FIG. 11, the server device 50 has a configuration similar to that of a typical personal computer device. The server device 50 includes a communication unit 51, a ROM 52, a RAM 53, a CPU 54, and an HDD 55. From the communication unit 51 to the HDD 55 are connected to each other via a bus line 56. The HDD 55 stores a printing processing program for the server device 50. The CPU 54 operates according to the printing processing program stored in the HDD 55 to mediate the communication between the MFP 1 and the portable terminal device 2.

Specifically, the CPU 54 of the server device 50 receives the print job transmitted from the portable terminal device 2, and transmits the print job to the MFP 1. The CPU 54 of the server device 50 also receives the positional information that is periodically detected and transmitted by the portable terminal device 2 that has transmitted the print job, and transmits the positional information to the MFP 1. In a case in which the portable terminal device 2 is configured to transmit the present position of itself when the MFP 1 has made a request for acquiring the present position, the CPU 54 of the server device 50 transmits the request for acquiring the present position from the MFP 1 to the portable terminal device 2. The CPU 54 of the server device 50 transmits the positional information transmitted from the portable terminal device 2 in response to the request for acquiring the present position to the MFP 1.

In this way, even with the configuration in which the MFP 1 communicates with the portable terminal device 2 via the server device 50, the same effect as the first embodiment can be obtained.

First Modification

The following describes a first modification of the information processing system according to each of the embodiments described above. In each of the embodiments described above, all the print jobs stored in the job DB 29 are caused to be determination targets of priority replacement processing. On the other hand, in the information processing system according to the first modification, the print job in which the distance L between the MFP 1 and the portable terminal device 2 of the sender of the print job is equal to or larger than a certain distance is caused to be the determination target of the priority replacement processing to perform priority replacement processing. Due to this, the number of operations for the priority replacement processing can be reduced, and a burden on the replacement processing unit 25 can be reduced.

Specifically, if the check unit 21 determines that the number of the print jobs stored in the job DB 29 is equal to or larger than 2 at Step S21 in the flowchart in FIG. 9, the replacement processing unit 25 calculates the distance L between the MFP 1 and the portable terminal device 2 of the sender of each print job.

When the distance L between the portable terminal device 2 and the MFP 1 is short such that the distance between the portable terminal device 2 and the MFP 1 is, for example, equal to or smaller than 2 m (when the distance L is equal to or smaller than a certain distance), the sender of the print job is positioned near the MFP 1. The printed matter corresponding to the print job is highly likely to be collected by the sender in a short time. Due to this, the replacement processing unit 25 performs the priority replacement processing using, as the determination target of the priority replacement processing, the print job of the portable terminal device 2 the distance L of which from the MFP 1 is equal to or larger than a certain distance. In other words, the replacement processing unit 25 excludes, from the determination target of the priority replacement processing, the print job of the portable terminal device 2 the distance L of which from the MFP 1 is equal to or smaller than a certain distance. The replacement processing unit 25 then performs the replacement processing described above on the other print jobs remained after the exclusion.

Due to this, the number of operations for the priority replacement processing can be reduced, a burden on the replacement processing unit 25 can be reduced, and the same effect as the embodiments described above can be obtained.

Second Modification

The following describes a second modification of the information processing system according to each of the embodiments described above. In the example of the information processing system according to each of the embodiments and the modification, the priority replacement processing is performed in units of print jobs. On the other hand, in the example of the information processing system according to the second modification, the priority replacement processing is performed on the print job in units of pages.

That is, in a case of the information processing system according to the second modification, when the print job is being executed, the replacement determination of a priority described with reference to FIG. 7 is performed on the print job currently being executed and the print job having the highest priority in the print job queue (the print job having the first priority). If it is determined that the print job being executed should be replaced with the print job having the first priority in the replacement determination (if it is determined that the print job having the first priority should be executed rather than the print job being executed), the replacement processing unit 25 temporarily stops the print job being executed, and stores the print job in a print job interruption stack provided in the RAM 18. The CPU 16 then controls execution of the print job having the first priority instead.

Next, after the print job having the first priority is completed, the CPU 16 restarts the print job in the midst of execution that has been stored in the print job interruption stack. In short, the print job being executed is temporarily stopped and the other print job is executed, that is, the printing process can be performed while replacing the priorities of the print jobs in units of pages.

In this case, when the printed matter of the interruption printing is ejected onto a paper ejection tray on which the printed matter of the print job temporarily stopped has been ejected, the printed matter of the print job temporarily stopped and the printed matter of the interruption printing are mixed on the paper ejection tray, and the user cannot easily collect the printed matter.

Due to this, the CPU 16 uses the positional information representing the present position of the portable terminal device 2 to determine the distance between the user of the interruption printing and the MFP 1. When the distance between the user of the interruption printing and the MFP 1 becomes equal to or smaller than a distance at which the user of the interruption printing can collect the printed matter of the interruption printing, the CPU 16 determines that the printed matter of the interruption printing is collected by the user of the interruption printing and restarts the print job that has been temporarily stopped. Thus, the printed matter of the print job that has been temporarily stopped is prevented from being mixed with the printed matter of the interruption printing.

Figure 12:
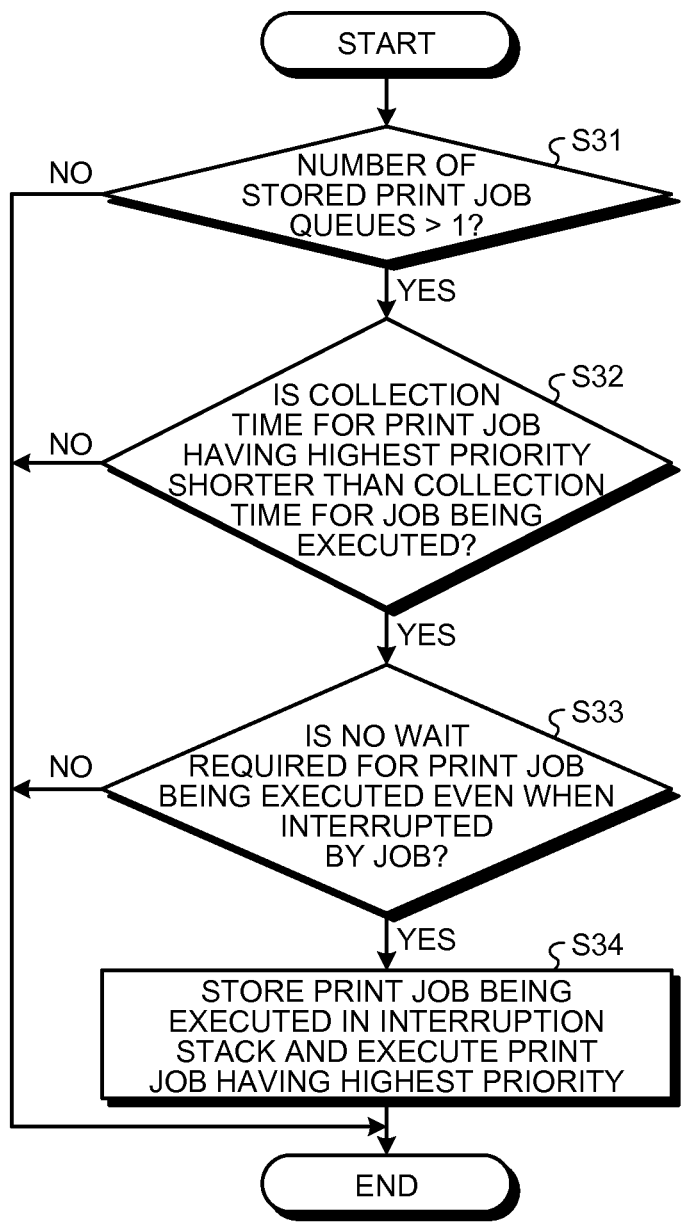
FIG. 12 is a flowchart illustrating a procedure of processing for determining whether to replace a print job being executed with a print job having the first priority stored in a print job queue.
Figure 14:
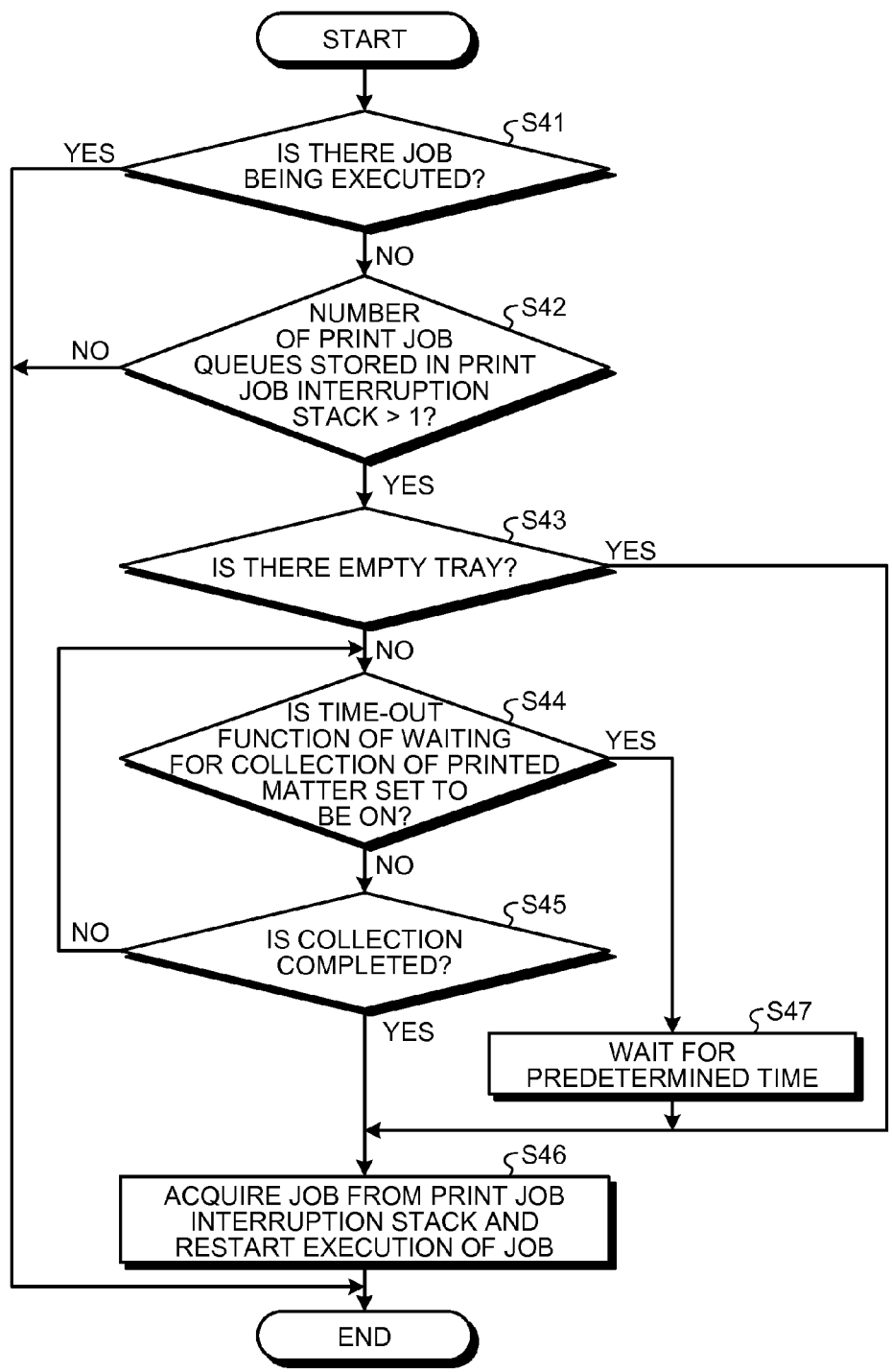
FIG. 14 is a flowchart illustrating a procedure for restarting a print job that has been temporarily stopped after the interruption printing is completed.

The flowcharts of FIG. 12 and FIG. 14 illustrate such a procedure of replacement processing of priorities in units of pages. FIG. 12 is a flowchart illustrating a procedure of processing for determining whether to replace the print job being executed with the print job having the first priority that is stored in the print job queue. The flowchart in FIG. 12 is started when the print job is started to be executed, and the process starts from Step S31.

At Step S31, the replacement processing unit 25 determines the number of print job queues stored in the job DB 29 in the RAM 18 described above with reference to FIG. 5. If the number of print job queues stored in the job DB 29 is equal to or larger than 1 (Yes at Step S31), the process proceeds to Step S32. On the other hand, if the number of print job queues stored in the job DB 29 is less than 1 (=the number of print job queues is 0: No at Step S31), any print job other than the print job currently being executed is not present, so that the CPU 16 ends the process of the flowchart in FIG. 12 as it is.

At Step S32, the collection time calculation unit 24 calculates the collection time for the printed matter corresponding to the print job having the first priority (the print job having the highest priority) and the collection time for the printed matter of the print job currently being executed. The replacement processing unit 25 determines whether the collection time for the printed matter corresponding to the print job having the first priority is shorter than the collection time for the printed matter of the print job currently being executed. That is, at Step S32, the replacement processing unit 25 determines whether the printed matter corresponding to the print job having the first priority will be collected before the print job currently being executed is completed. If the print job currently being executed will be completed before the printed matter corresponding to the print job having the first priority is collected (No at Step S32), the CPU 16 ends the process of the flowchart in FIG. 12 as it is. On the other hand, if the printed matter corresponding to the print job having the first priority is estimated to be collected before the print job currently being executed is completed (Yes at Step S32), the process proceeds to Step S33.

Next, at Step S33, the replacement processing unit 25 determines whether the user who comes to collect the printed matter of the print job currently being executed can immediately collect the printed matter even when the print job currently being executed is temporarily stopped and interrupted by the print job having the first priority to be executed. If it is determined that the user will be made to wait (No at Step S33), the CPU 16 ends the process of the flowchart in FIG. 12 as it is. On the other hand, if it is determined that the user will not be made to wait (Yes at Step S33), the process proceeds to Step S34.

Figure 13:
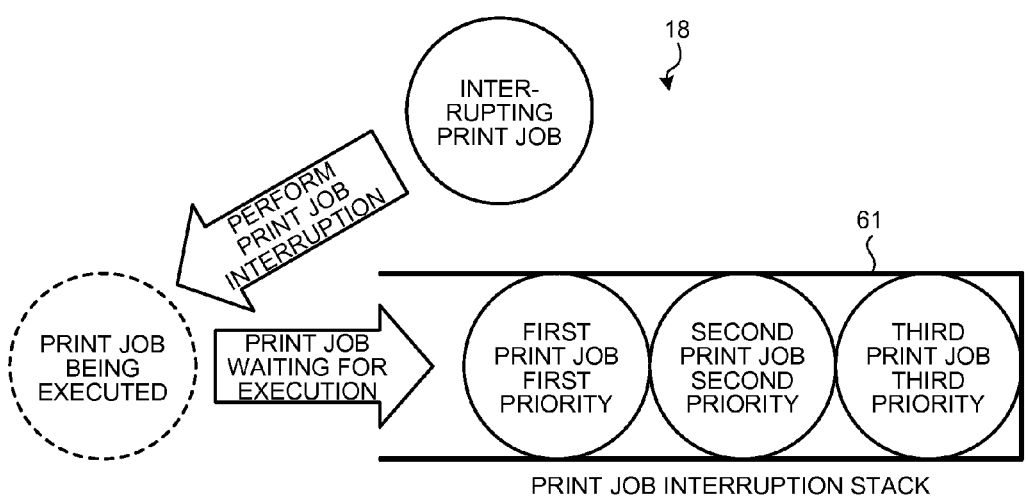
FIG. 13 is a diagram schematically illustrating interruption printing.

At Step S34, the replacement processing unit 25 temporarily stops the print job currently being executed, and executes the interrupting print job having the first priority. Thus, the entire process of the flowchart in FIG. 12 is ended. FIG. 13 schematically illustrates such interruption printing. In FIG. 13, the print job represented by a circle of a dotted line is the print job currently being executed. To perform interruption printing, the replacement processing unit 25 temporarily stops the print job currently being executed, and stores the print job in a print job interruption stack 61 that is arranged in a storage unit such as the RAM 18 and stores the print job in a Last In First Out (LIFO) format. The replacement processing unit 25 acquires a first print job having the first priority from the print job interruption stack 61 in place of the stored print job. Accordingly, the execution of the print job currently being executed is temporarily stopped, and the first print job becomes the print job to be executed.

The CPU 16 executes the replaced first print job. After the first print job is completed, the print job temporarily stopped that has been stored in the print job interruption stack 61 is read out and restarted. Thus, the printing processing can be performed while replacing the priorities of the print jobs in units of pages, and print waiting time for the first print job can be further reduced.

FIG. 14 is a flowchart illustrating a procedure for restarting the print job that has been temporarily stopped after the interruption printing is completed. The flowchart in FIG. 14 is started when the interruption printing is completed, and the process starts from Step S41. At Step S41, the CPU 16 determines whether the print job being executed is present. That is, at Step S41, the CPU 16 determines whether the print job of the interruption printing is being executed. If the print job of the interruption printing is being executed (Yes at Step S41), the flowchart in FIG. 14 is ended as it is. On the other hand, if the print job of the interruption printing is completed (No at Step S41), the process proceeds to Step S42.

At Step S42, the CPU 16 determines the number of print job queues stored in the print job interruption stack 61. When one or more print job queues are stored in the print job interruption stack 61, the print job that has been temporarily stopped is stored in the print job interruption stack 61. Thus, when the number of print job queues stored in the print job interruption stack 61 is equal to or larger than 1 (Yes at Step S42), the CPU 16 advances the process to Step S43.

On the other hand, when the number of print job queues stored in the print job interruption stack 61 is less than 1 (=when the number of print job queues is 0: No at Step S31), the print job other than the print job currently being executed is not present. Accordingly, the CPU 16 ends the process of the flowchart in FIG. 12 as it is.

At Step S43, the CPU 16 determines whether there is a paper ejection tray (empty tray) onto which the ejected printed matter is currently not present, the paper ejection tray being different from the paper ejection tray onto which the printed matter of the interruption printing has been ejected. That is, in this example, the MFP 1 includes a plurality of paper ejection trays. In a case of an MFP including only one paper ejection tray, the process at Step S43 is skipped. If the empty tray is present (Yes at Step S43), the process proceeds to Step S46.

At Step S46, the CPU 16 acquires the print job temporarily stopped that has been stored in the print job interruption stack 61 and restarts the print job. The CPU 16 controls a paper ejection mechanism so that the printed matter of the restarted print job will be ejected onto the empty tray detected at Step S43. Due to this, the printed matter of the interruption printing can be prevented from being mixed with the printed matter of the print job the execution of which has been temporarily stopped, on the same paper ejection tray.

The CPU 16 may control the paper ejection mechanism to detect the paper ejection tray used when the execution of the print job was temporarily stopped as the empty tray described above, and cause the printed matter of the restarted print job to be ejected thereon.

On the other hand, in a case in which only one paper ejection tray is arranged, or although a plurality of paper ejection trays are arranged, the printed matter is present on all of the paper ejection trays other than the paper ejection tray on which the printed matter of the interruption printing has been ejected (if the printed matter is not collected: No at Step S43), the CPU 16 advances the process to Step S44. At Step S44, the CPU 16 determines whether a time-out function of waiting for collection of the printed matter is set to be ON. Specifically, the information processing system according to the second modification has the time-out function of waiting for collection of the printed matter to wait for restart of the print job that has been temporarily stopped until the collection time at which the printed matter of the interruption printing is collected by the user. The time-out function can be set by an administrator of the MFP 1 via a setting menu. By way of example, the time-out function is set to be ON in a default setting. The setting information of the time-out function is stored in the storage unit such as the RAM 18, the HDD 19, and the ROM 17 illustrated in FIG. 1. At Step S44, the CPU 16 refers to the setting information stored in the storage unit to determine whether the time-out function is set to be ON.

If the time-out function is set to be ON (Yes at Step S44), the process proceeds to Step S47, and the CPU 16 waits for restart of the print job that has been temporarily stopped until the collection time calculated by the collection time calculation unit 24 at which the printed matter of the interruption printing will be collected by the user. When the collection time has been reached, the CPU 16 determines that the printed matter of the interruption printing is collected by the user, and restarts, at Step S46, the print job that has been temporarily stopped.

On the other hand, if the time-out function is not set to be ON (No at Step S44), the CPU 16 determines whether the distance between the MFP 1 and the present position of the portable terminal device 2 of the user of the interruption printing acquired by the position acquisition unit 22 becomes the distance at which the printed matter of the interruption printing can be collected. That is, when the distance between the user of the interruption printing and the MFP 1 is, for example, equal to or smaller than 30 cm, it can be said that the user can collect the printed matter of the interruption printing from the paper ejection tray of the MFP 1 at that distance. Thus, the CPU 16 determines that the printed matter has been collected when the distance between the user of the interruption printing and the MFP 1 has become equal to or smaller than the distance at which the user can collect the printed matter of the interruption printing (Yes at Step S45), and restarts the print job that has been temporarily stopped at Step S46.

As is obvious from the above description, the information processing system according to the second modification temporarily stops the print job being executed when having detected the print job in which the collection time for the printed matter is estimated to be earlier than the collection time for the printed matter of the print job being executed. Then interruption printing of the print job in which the collection time for the printed matter is estimated to be earlier is performed, and the print job that has been temporarily stopped is restarted after the interruption printing is completed. Accordingly, the printing processing can be performed while replacing the priorities of the print jobs in units of pages, the print waiting time for the user can be further reduced, and the same effect as the embodiments described above can be obtained.

When the time-out function is set to be ON, the information processing system waits for restart of the print job that has been temporarily stopped until the collection time at which the printed matter of the interruption printing will be collected by the user. When the collection time has passed, the information processing system determines that the printed matter of the interruption printing has been collected by the user, and restarts the print job that has been temporarily stopped. Accordingly, the print job that has been temporarily stopped can be restarted after the printed matter of the interruption printing has been collected by the user, and the printed matter of the interruption printing can be prevented from being mixed with the printed matter of the print job that has been temporarily stopped. That is, the user can collect the printed matter of the preceding print job and the printed matter of the interruption printing clearly separately from each other.

In a case in which the time-out function is set to be OFF, when the distance between the user of the interruption printing and the MFP 1 has become equal to or smaller than the distance at which the user can collect the printed matter of the interruption printing from the paper ejection tray of the MFP 1, the information processing system determines that the printed matter of the interruption printing is collected by the user, and restarts the print job that has been temporarily stopped. Accordingly, the print job that has been temporarily stopped can be restarted after the printed matter of the interruption printing is collected by the user, and the printed matter of the interruption printing can be prevented from being mixed with the printed matter of the print job that has been temporarily stopped. That is, the user can collect the printed matter of the preceding print job and the printed matter of the interruption printing clearly separately from each other.

The printed matter of the restarted print job is ejected onto the empty tray. Accordingly, the printed matter of the interruption printing can be prevented from being mixed with the printed matter of the print job that has been temporarily stopped, and the user can collect the printed matter of the preceding print job and the printed matter of the interruption printing clearly separately from each other.

The embodiments and the modifications described above are exemplary only, and are not intended to limit the scope of the present invention. These novel embodiments and modifications can be implemented in other various forms. The embodiments and the modifications can be variously omitted, replaced, and modified without departing from the gist of the present invention.

For example, the information processing system may continuously perform the replacement determination during execution of the print job, may perform priority replacement processing by interrupting the print job being executed if the condition described with reference to FIG. 7 is satisfied, and may process the print job according to the replaced priorities (interruption). In this case, each print job is processed as interruption such that the print job having a lower priority is executed during printing of the print job having a higher priority, for example. Accordingly, the print job can be executed while performing finer replacement processing.

According to an embodiment, efficiency of information output can be enhanced.

According to an aspect, an information processing system includes: a terminal device; and an information processing device. The terminal device detects and transmits a current position at predetermined timings after transmitting an information processing request. The information processing device includes: a storage processing unit that receives the information processing request transmitted from the terminal device and then stores the information processing request and a priority for executing the information processing request in a storage unit in association with each other; an information processing unit that executes information processing requests stored in the storage unit in order from an information processing request in association with which a higher priority is stored; a moving speed calculation unit that calculates a moving speed of the terminal device based on, out of positional information transmitted at the predetermined timings from the terminal device that has transmitted the information processing request, first positional information transmitted at a first timing and second positional information transmitted at a second timing subsequent to the first positional information; a time calculation unit that calculates a time until a distance between the terminal device and the information processing device becomes equal to or smaller than a predetermined value based on the moving speed calculated by the moving speed calculation unit, positional information of the information processing device, and the second positional information; and a replacement processing unit that replaces, when a second time as the time until the distance between a second terminal device that has transmitted a second information processing request having a lower priority and the information processing device becomes equal to or smaller than a predetermined value is shorter than a first time as the time until the distance between a first terminal device that has transmitted a first information processing request having a higher priority and the information processing device becomes equal to or smaller than a predetermined value, the priorities stored in the storage unit in association with the first information processing request and the second information processing request such that the second information processing request having the lower priority is processed earlier than the first information processing request having the higher priority.

According to an aspect, an information processing system includes: a terminal device; and a server device. The terminal device detects and transmits a current position at predetermined timings after transmitting an information processing request. The server device transmits the information processing request and the current position received from the terminal device to an information processing device. The information processing device includes: a storage processing unit that receives the information processing request transmitted from the terminal device and then stores the information processing request and a priority for executing the information processing request in a storage unit in association with each other; an information processing unit that executes information processing requests stored in the storage unit in order from an information processing request in association with which a higher priority is stored; a moving speed calculation unit that calculates a moving speed of the terminal device based on, out of positional information transmitted at the predetermined timings from the terminal device that has transmitted the information processing request, first positional information transmitted at a first timing and second positional information transmitted at a second timing subsequent to the first positional information; a time calculation unit that calculates a time until a distance between the terminal device and the information processing device becomes equal to or smaller than a predetermined value based on the moving speed calculated by the moving speed calculation unit, positional information of the information processing device, and the second positional information; and a replacement processing unit that replaces, when a second time as the time until the distance between a second terminal device that has transmitted a second information processing request having a lower priority and the information processing device becomes equal to or smaller than a predetermined value is shorter than a first time as the time until the distance between a first terminal device that has transmitted a first information processing request having a higher priority and the information processing device becomes equal to or smaller than a predetermined value, the priorities stored in the storage unit in association with the first information processing request and the second information processing request such that the second information processing request having the lower priority is processed earlier than the first information processing request having the higher priority.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
   a memory storing a program;
   a processor configured to execute the stored program to, with regard to each terminal device of a first terminal device and a second terminal device, store, in the memory, an information processing request received from the terminal device and an execution priority associated with the information processing request, calculates a moving speed of the terminal device based on first terminal device positional information received from the terminal device at a first time and second terminal device positional information received from the terminal device at a second time subsequent to the first time, and calculates a time associated with the terminal device based on the moving speed, positional information associated with the information processing device, and the second terminal device positional information, the time being an amount of time remaining until a distance between the terminal device and the information processing device becomes equal to or smaller than a particular value;

the processor further configured to execute the stored program to replace a stored first execution priority and second execution priority associated with a first information processing request received from the first terminal device and a second information processing request received from the second terminal device, respectively, such that the second information processing request is processed earlier than the first information processing request, based on a determination that the stored second execution priority is lower than the stored first execution priority, the calculated time associated with the second terminal device is shorter than the calculated time associated with the first terminal device, and an amount of elapsed time associated with processing both the first information processing request and the second information processing request is shorter than the calculated time associated with the first terminal device; and an engine unit configured to execute information processing requests stored in the memory in an order corresponding to the execution priorities associated with the information processing requests, the engine unit further configured to output information corresponding to one or more information processing requests to a physical medium.

2. The information processing device according to claim 1, the processor further configured to execute the program to, with regard to each terminal device of the first terminal device and the second terminal device, acquires a position of the terminal device from which the information processing request is received.

3. The information processing device according to claim 1, wherein the processor is further configured to execute the program to store, in the memory, the positional information associated with the information processing device; and the processor is further configured to execute the program to, with regard to each terminal device of the first terminal device and the second terminal device, reads out the positional information associated with the information processing device from the memory to calculate the time associated with the terminal device.

4. The information processing device according to claim 2, the processor further configured to execute the program to, with regard to each terminal device of the first terminal device and the second terminal device, acquires a position of the terminal device that is detected and transmitted by the terminal device.

5. The information processing device according to claim 4, wherein the position of the terminal device is received based on a determination that a moving distance associated with the terminal device is equal to or larger than a particular moving distance value, the moving distance being a difference between a first position detected by the terminal device and a second position detected by the terminal device prior to the detection of the first position.

6. The information processing device according to claim 1, wherein the engine unit is configured to prints the information corresponding to one or more information processing requests on a paper medium.

7. The information processing device according to claim 1, the processor further configured to execute the program to performs replacement processing of execution priorities associated with information processing requests received from a set of terminal devices, based on a determination that each terminal device, of the set of terminal devices, is separated from the information processing device according to a distances that at least meets a particular distance value, respectively.

8. An information processing system, comprising:

a first terminal device and a second terminal device, each terminal device of the first terminal device and the second terminal device configured to transmit an information processing request, and detect and transmit information indicating a current position of the terminal device subsequently to transmitting the information processing request;

an information processing device; and a server device configured to, with regard to each terminal device of the first terminal device and the second terminal device, receive, from the terminal device, the information processing request and information indicating the detected current position of the terminal device, and transmit the received information processing request and the information indicating the detected current position of the terminal device to the information processing device, wherein the information processing device includes, a memory storing a program;

a processor configured to execute the stored program to, with regard to each terminal device of the first terminal device and the second terminal device, store, in the memory, an information processing request received from the terminal device and an execution priority associated with the information processing request, calculate a moving speed of the terminal device based on first terminal device positional information received from the terminal device at a first time and second terminal device positional information received from the terminal device at a second time subsequent to the first time, and calculate a time associated with the terminal device based on the moving speed, positional information associated with the information processing device, and the second terminal device positional information, the time being an amount of time remaining until a distance between the terminal device and the information processing device becomes equal to or smaller than a particular value;

the processor further configured to execute the stored program to replace a stored first execution priority and second execution priority associated with a first information processing request received from the first terminal device and a second information processing request received from the second terminal device, respectively, such that the second information processing request is processed earlier than the first information processing request, based on a determination that the second execution priority is lower than the first execution priority, the calculated time associated with the second terminal device is shorter than the calculated time associated with the first terminal device, and an amount of elapsed time associated with processing both the first information processing request and the second information processing request is shorter than the calculated time associated with the first terminal device; and an engine unit configured to execute information processing requests stored in the memory in an order corresponding to the execution priorities associated with the information processing requests, the engine unit further configured to output information corresponding to one or more information processing requests to a physical medium.

9. The information processing system according to claim 8, wherein, each terminal device of the first terminal device and the second terminal device is configured to detect a position of the terminal device, and transmit, to the information processing device, information indicating the detected position of the terminal device.

10. The information processing system according to claim 9, wherein, each terminal device of the first terminal device and the second terminal device is configured to transmit, to the information processing device, information indicating the detected position of the terminal device based on a determination that a moving distance associated with the terminal device is equal to or larger than a particular moving distance value, the moving distance being a difference between a first position detected by the terminal device and a second position detected by the terminal device prior to the detection of the first position.

11. The information processing system according to claim 8, wherein, the processor is further configured to execute the program to store, in the memory, the positional information associated with the information processing device; and the processor is further configured to execute the program to, for each terminal device of the first terminal device and the second terminal device, read out the positional information associated with the information processing device from the memory to calculate the time associated with the terminal device.

12. The information processing system according to claim 8, wherein the engine unit is configured to print the information corresponding to the information processing request on a paper medium.

13. The information processing system according to claim 8, the processor further configured to execute the program to perform replacement processing of execution priorities associated with information processing requests received from the first and second terminal devices, based on a determination that each terminal device, of the first and second terminal devices, is separated from the information processing device according to a distance that at least meets a particular distance value, respectively.

14. An information processing method performed by an information processing device, the method comprising:

performing, with regard to each terminal device of a first terminal device and a second terminal device, each of, storing, in the memory, an information processing request received from the terminal device and an execution priority associated with the information processing request, calculating a moving speed of the terminal device based on first terminal device positional information received from the terminal device at a first time and second terminal device positional information received from the terminal device at a second time subsequent to the first time, and calculating a time associated with the terminal device based on the moving speed, positional information associated with the information processing device, and the second terminal device positional information, the time being an amount of time remaining until a distance between the terminal device and the information processing device becomes equal to or smaller than a particular value;

replacing a stored first execution priority and second execution priority associated with a first information processing request received from the first terminal device and a second information processing request received from the second terminal device, respectively, such that the second information processing request is processed earlier than the first information processing request, based on a determination that the second execution priority is lower than the first execution priority, the calculated time associated with the second terminal device is shorter than the calculated time associated with the first terminal device, and an amount of elapsed time associated with processing both the first information processing request and the second information processing request is shorter than the calculated time associated with the first terminal device; and executing information processing requests stored in the memory in an order corresponding to the execution priorities associated with the information processing requests.

15. The information processing method according to claim 14, the information processing method further comprising:

acquiring a position of the terminal device that has transmitted the information processing request.

16. The information processing method according to claim 15, wherein the acquiring includes acquiring the position of the terminal device that is detected and transmitted by the terminal device.

17. The information processing method according to claim 16, wherein the acquiring includes acquiring the position of the terminal device that is received based on a determination that a moving distance associated with the terminal device is equal to or larger than a particular moving distance value, the moving distance being a difference between a first position detected by the terminal device and a second position detected by the terminal device prior to the detection of the first position.

18. The information processing method according to claim 14, wherein
the receiving includes performing one of
storing, in the memory, the positional information of the information processing device, or
storing input positional information of the information processing device in the memory; and
the calculating of the time includes reading out the positional information of the information processing device from the memory to calculate the time.

19. The information processing method according to claim 14, wherein the executing includes outputting; information corresponding to the information processing request to a physical medium.

20. The information processing method according to claim 19, wherein the executing includes printing the information corresponding to the information processing request on a paper medium.

* * * * *